United States Patent
Norheim

(10) Patent No.: US 6,746,220 B2
(45) Date of Patent: Jun. 8, 2004

(54) PRESSURE FLUID-DELIVERY DEVICE

(75) Inventor: Daniel Norheim, Kongsberg (NO)

(73) Assignee: Kongsberg Automotive ASA, Kongsberg (NO)

( * ) Notice: Subject to any disclaimer, the term of this patent is extended or adjusted under 35 U.S.C. 154(b) by 15 days.

(21) Appl. No.: 10/168,677

(22) PCT Filed: Dec. 21, 2000

(86) PCT No.: PCT/NO00/00444

§ 371 (c)(1),
(2), (4) Date: Jun. 26, 2002

(87) PCT Pub. No.: WO01/50044

PCT Pub. Date: Jul. 12, 2001

(65) Prior Publication Data

US 2003/0010202 A1 Jan. 16, 2003

(30) Foreign Application Priority Data

Jan. 5, 2000 (SE) ............................................. 20000036

(51) Int. Cl.$^7$ ................................................ F04B 53/12
(52) U.S. Cl. ......................... 417/552; 417/450; 91/422
(58) Field of Search ................................ 417/450, 552, 417/553, 437, 442, 446, 448, 449, 550, 551, 545, 546; 92/245, 240, 241, 242, 243, 244, 246, 247, 248, 249; 91/422, 418, 419, 420, 421

(56) References Cited

U.S. PATENT DOCUMENTS 4,023,467 A * 5/1977 Thurner ........................ 91/422
4,753,075 A 6/1988 Nomura et al.
4,932,312 A 6/1990 Sugimoto
5,056,313 A 10/1991 Venetos et al.
5,092,125 A * 3/1992 Leight-Monstevens et al. ............................ 60/589
5,111,661 A 5/1992 Savidan et al.
5,179,834 A 1/1993 Rauschenbach
5,193,433 A * 3/1993 Reimer ........................ 92/85 B
5,775,886 A * 7/1998 Terwilliger .................. 417/553

FOREIGN PATENT DOCUMENTS

EP 0 159 236 10/1985

* cited by examiner

Primary Examiner—Justine R. Yu
Assistant Examiner—John F. Belena
(74) Attorney, Agent, or Firm—Finnegan, Henderson, Farabow, Garrett & Dunner, L.L.P.

(57) ABSTRACT

A pressure fluid-delivery device comprising a cylinder, a piston and a reservoir for a fluid. A V-seal is mounted in an annulus between the cylinder and the piston. An axial movement of the piston forwards relative to the cylinder results in a delivery of a pressure fluid from the cylinder space. A first leg, in a similar fashion to a check valve, hereby springingly attempts to seal an outlet opening of a channel, which communicates with the reservoir. When the piston is moved backwards, this leg can open the outlet opening, admitting fluid into the cylinder space. The seal rests on a forwardly facing, radially outwardly extending surface of the piston. The seal's first leg projects slantingly radially inwards and is arranged to come into abutment against an axially extending portion of the piston. The seal's second leg projects slantingly radially outwards and constantly abuts sealingly against the cylinder surface.

6 Claims, 2 Drawing Sheets

PRESSURE FLUID-DELIVERY DEVICE

BACKGROUND OF THE INVENTION

The invention relates to a pressure fluid-delivery device comprising a cylinder a piston which is arranged to be moved backwards and forwards in the cylinder, and which has an end portion, which together with an adjacent end portion of the cylinder defines a cylinder space, which is arranged to be connected to a receiver for the pressure fluid, where an axial movement of the piston in a first direction relative to the cylinder, hereinafter called forwards, causes a reduction in the cylinder space and a delivery of pressure fluid therefrom to the receiver, a reservoir for the fluid, and a seal which is V-shaped in cross section and which is mounted in an annulus between the cylinder and the piston and attempts to prevent a fluid flow out of the cylinder space via the annulus, and which has a bottom portion and two legs which are interconnected via the bottom portion and project away from each other and forwards from the bottom portion, a first leg, in a similar fashion to a check valve, springingly attempting to seal an outlet opening of a channel which communicates with the reservoir in such a manner that the first leg seals the outlet opening when the pressure in the fluid in the cylinder space is greater than the pressure in the fluid in the reservoir, but opens the outlet opening when the pressure in the fluid in the reservoir is greater than the pressure in the fluid in the cylinder space.

A pressure fluid-delivery device of the above-mentioned type is known from EP-B1-0159 236, where the seal is mounted in a circumferential groove provided in the cylinder. The groove is open radially inwards towards the piston, the seal's first leg facing radially outwards and the seal's second leg facing radially inwards and constantly abutting sealingly against an adjacent, cylindrical surface of the piston.

Because the groove is provided in the cylinder, its outer diameter has to be correspondingly increased at least at the location of the groove. Furthermore, the channel is arranged in the cylinder in a relatively complicated manner by providing a number of bores which have to be manufactured in separate machining stages.

This results in a pressure-delivery device which is large and expensive to manufacture.

The object of the invention is to provide a pressure-delivery device of the type mentioned in the introduction which is encumbered to a lesser extent by the above-mentioned disadvantages.

SUMMARY OF THE INVENTION

In accordance with the object, this invention provides a pressure fluid-delivery device comprising a cylinder, a piston, which is arranged to be moved backwards and forwards in the cylinder, and which has an end portion, which together with an adjacent end portion of the cylinder defines a front cylinder space, where an axial movement of the piston forwards relative to the cylinder causes a reduction in the volume of the cylinder space and a delivery of pressure fluid from this space, a reservoir for the fluid, and a seal which is V-shaped in cross section and which is mounted in an annulus between the cylinder and the piston and attempts to prevent a fluid flow out of the cylinder space via the annulus, and which has a bottom portion and two legs which are interconnected via the bottom portion and project away from each other and forwards from the bottom portion, a first leg, in a similar fashion to a check valve, springingly attempting to seal an outlet opening of a channel which communicates with the reservoir in such a manner that the first leg seals the outlet opening when the pressure in the fluid in the cylinder space is greater than the pressure in the fluid in the reservoir, but opens the outlet opening when the pressure in the fluid in the reservoir is greater than the pressure in the fluid in the cylinder space, characterized in that the seal rests on a forwardly facing, radially outwardly extending surface of the piston, the seal's first leg projecting slantingly radially inwards and being arranged to come into abutment against an axially extending portion of the piston, and the seal's second leg projects slantingly radially outwards and is arranged to slide on and constantly to abut against the cylinder surface.

BRIEF DESCRIPTION OF THE DRAWINGS

The invention will now be described in more detail with reference to the drawing which schematically illustrates embodiments of a pressure fluid-delivery device according to the invention.

DETAILED DESCRIPTION OF THE INVENTION

Figure 1:
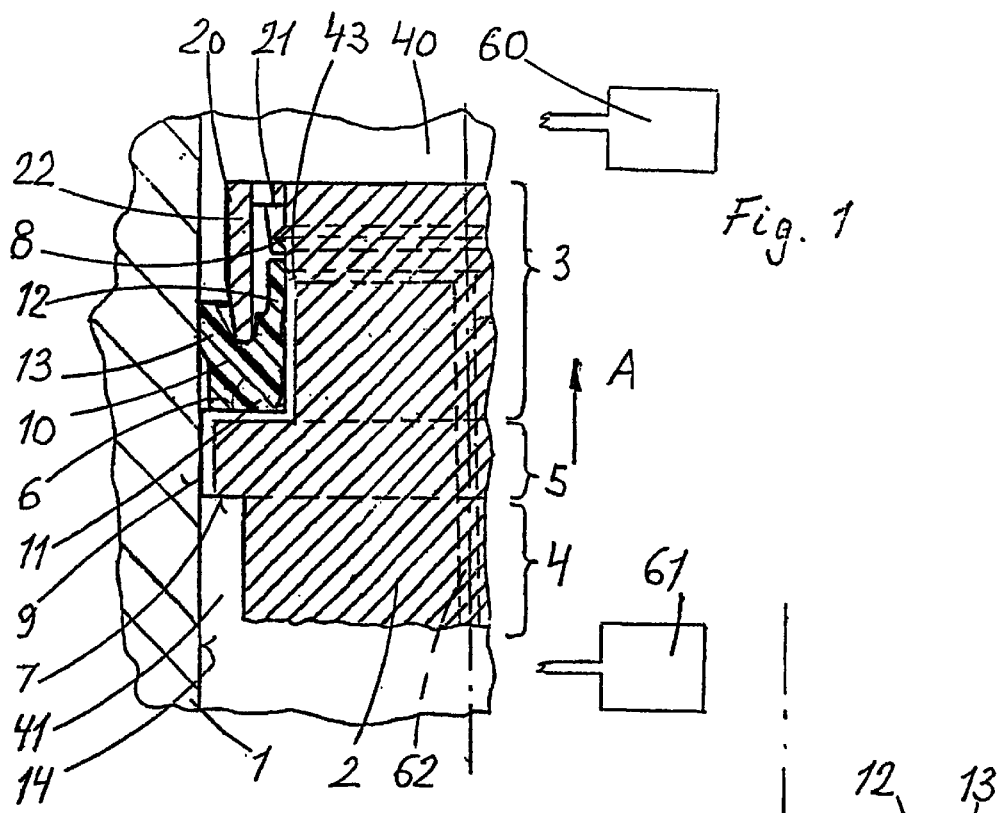
FIG. 1 is a longitudinal section through a piston and a cylinder and a seal mounted therebetween according to a first embodiment of a device according to the invention, where portions of the cylinder and the piston have been cut away and the section through the piston follows line I—I in FIG. 3.

As illustrated in FIG. 1, a pressure-delivery device according to the invention comprises a cylinder 1 wherein there is mounted a piston 2, which can be moved axially backwards and forwards, where a direction which may be designated as forwards corresponds to the direction of the arrow A.

The piston 2 comprises a front end portion 3, with a diameter which is smaller than the diameter of the cylinder 1. The piston also has a rear end portion 4 with a diameter which may be slightly larger than the diameter of the front end portion 3, and between the end portions the piston has an outwardly projecting flange portion 5 with a cylindrical sliding surface 9 with a diameter which is larger than the diameter of the rear end portion and only slightly smaller than the diameter of the piston 2, thus enabling the piston during its movement forwards and backwards in the cylinder to be moved slidingly against the cylinder via this sliding surface 9. The flange portion 5 has a radial front flange surface 6 and a radial rear flange surface 7. The front piston end portion 3 has a circumferential first bead 8 near its front end.

Figure 2:
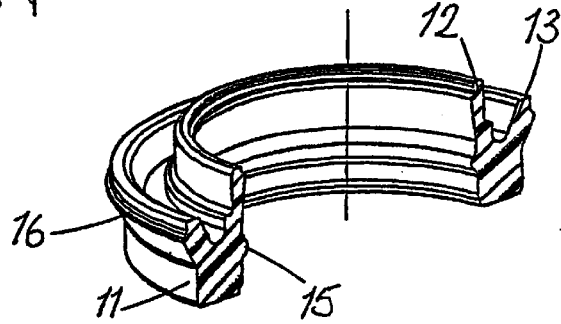
FIG. 2 is a perspective view of the seal illustrated in FIG. 1, where the seal has been cut through along an axially extending plane.
Figure 3:
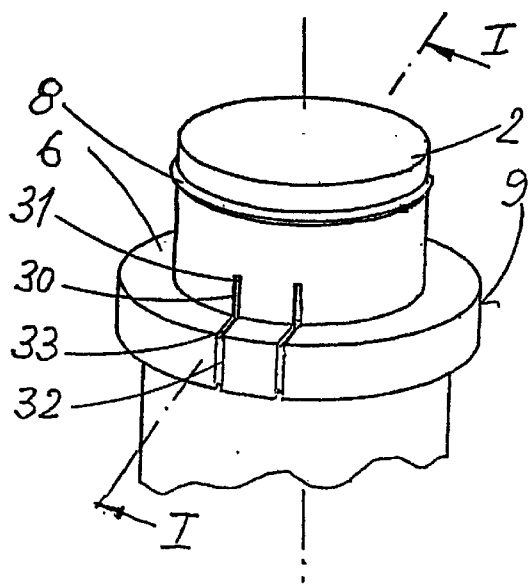
FIG. 3 is a perspective view of the piston illustrated in FIG. 1, where a portion of the piston has been cut away.

On the front flange surface 6 there is mounted an annular seal 10 which is also illustrated in FIG. 2, and which is made of a rubber elastic material. It is substantially V-shaped in cross section and has a bottom portion 11 from which there projects a radial inner first leg 12 and a radial outer second leg 13. The first leg 12 is slightly longer and thinner than the second leg 13. The first leg can therefore slightly more easily elastically deform than the outer leg.

The seal's bottom portion abuts against the front flange surface 6. The seal's first leg 12 attempts to abut against the piston's front end portion 3, exerting a relatively small force against it on account of its slight thickness, while the seal's second leg 13 attempts to abut against the cylinder's inner surface 14 while exerting a relatively large force against this inner surface 14 on account of its substantial thickness.

In order to support the rear portion of the seal 10 radially and to transfer a part of the reactive force which is exerted as a reaction to the large radially outwardly directed force exerted by the second leg 13 against the cylinder wall 14, the seal may have near its bottom portion 11 a radially inwardly projecting, circumferential, second bead 15 which abuts against the front end portion 3. In order to provide a good sealing connection between the seal 10 and the cylinder wall 14, the second leg 13 may have a radially outwardly facing, circumferential bead or sealing lip 16.

Round the front end portion 3 of the piston there is provided a holding element 20 which in cross section may be in the form of a ring which is U-shaped in cross section and one of whose radially inner legs 21 is arranged to grip the first bead 8, thereby securing the holding element 20 axially. The second, radially outer leg 22 is arranged to project backwards between the legs 12, 13 of the seal 10 and come into abutment against its bottom portion 11. The seal 10 is thereby secured axially, with the result that its bottom portion constantly abuts against the front flange surface 6 during a forward and backward movement of the piston. The holding body is preferably made of plastic, but may be made of any other suitable material whatever, e.g. metal.

In the piston 2 there is provided an outwardly open groove 30 with a first groove portion 31, which, when the seal 10 is mounted on the piston 2, runs axially backwards to the flange portion 5 from a point on the piston 2 which is located behind the front edge of the first leg 12 of the seal 10. In the sliding surface 9 of the flange portion 5 there also runs a second axial groove portion 32. The first and the second groove portions 31, 32 are interconnected via a third groove portion 33 which is provided in the front flange surface 6.

The front end portion 3 of the piston 2 together with the seal 10 and an adjacent portion of the cylinder 1 define a front cylinder space 40. The rear end portion 4 of the piston 2 and an adjacent portion of the cylinder 1 define a rear cylinder space 41. The front cylinder space 40 communicates constantly with a pressure fluid receiver 60, while the rear cylinder space 41 can constantly communicate with a reservoir 61 for a pressure fluid. Alternatively, the rear cylinder space 41 can form the fluid reservoir. In this case there is no need for a separate reservoir 61.

When the seal 10 is mounted on the piston 2, the groove 30 together with the cylinder 1 and the piston 2 form a continuous channel which extends from the rear cylinder space 41 and which is terminated radially within the front portion of the seal's first leg 12. The front end of the channel can therefore be described as a front opening or channel opening 43.

Instead of the groove 30, in the piston 2 a channel 62 may be provided extending from the rear cylinder space 41 to the location of the channel opening 43, as indicated by dot-and-dash lines in FIG. 1.

When the piston 2 is at rest and no force is attempting to move it forwards or backwards, the pressure in a fluid in the front cylinder space 40 is equal to the pressure in the fluid in the rear cylinder space 41, i.e. the differential pressure over the seal is zero. The seal's first leg 12 then abuts only lightly against the front end portion 3 of the piston, only covering the opening 43 due to its inherent elasticity or initial tension. The seal's second leg 13, however, abuts more strongly against the cylinder wall 41 due to this leg's higher initial tension.

During a forward or upward movement of the piston 2, the pressure in the pressure fluid in the front cylinder space 40 is increased, with the result that an attempt is made to force the pressure fluid out of this cylinder space towards the pressure fluid receiver. The seal's second leg 13 hereby constantly abuts sealingly against the cylinder wall 14 and, on account of the increased pressure in the fluid in the front cylinder space 40, the seal's first leg 12 is pressed hard against the front piston portion 3, thus sealing the opening 43 completely.

If the piston 2 is moved rapidly backwards, e.g. pulled backwards by means of a piston rod (not illustrated), thus generating a differential pressure over the seal which is directed towards the front cylinder space 40, i.e. the pressure in the fluid in the rear cylinder space 41 is greater than the pressure in the fluid in the front cylinder space 40, the seal's first leg is moved away from the opening 43. Fluid can thereby flow from the reservoir 61 to the front cylinder space 40 via the channel 30. Such a flow can also be obtained if a fluid leakage should occur in the front cylinder space 40.

Alternatively, the second groove portion 32 may be omitted, e.g. if there is a sufficiently large clearance between the flange portion 5 and the cylinder 1 to permit a fluid flow between these components, and at the same time the piston can be sufficiently well controlled during its movement.

Figure 4:
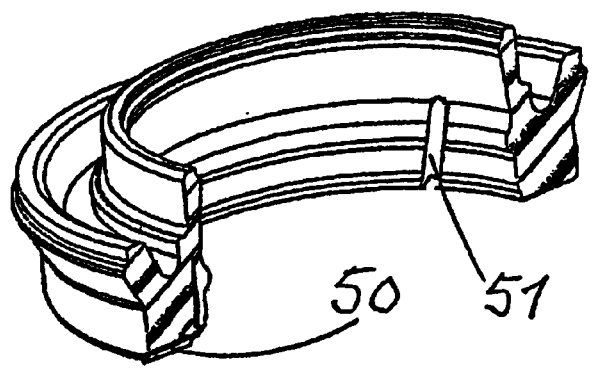
FIG. 4 is a view resembling that illustrated in FIG. 2, but illustrating a second embodiment of the seal.
Figure 5:
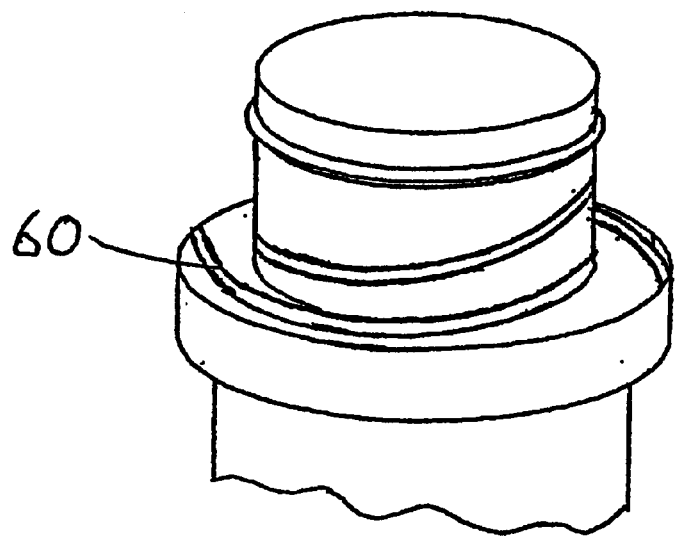
FIG. 5 is a view resembling that illustrated in FIG. 3, but illustrating a second embodiment of a piston.

Instead of providing a groove 30 with a first groove portion 31 and a third groove portion 33 in the piston, two corresponding seal groove portions 50, 51 may be provided in the seal, as illustrated in FIG. 4, these seal groove portions 50, 51 extending, e.g., near the locations where the first and second piston groove portions 31, 33 otherwise would have been provided. A channel can thereby be obtained corresponding to the above-mentioned channel which connects the fluid reservoir with the channel opening 43 near the seal's first leg 12.

Instead of the groove 30, in the piston there may be provided a spiral-shaped groove 60 extending in the front flange surface 6 and in the cylindrical surface of the front piston portion 3. The advantage of the spiral-shaped groove is that it can easily be fabricated in a lathe.

What is claimed is:

1. A pressure fluid-delivery device comprising, a cylinder, a piston which is arranged to be moved backwards and forwards in the cylinder, and which has an end portion, which together with adjacent end portion of the cylinder defines a front cylinder space, where axial movement of the piston forwards relative to the cylinder causes a reduction in the volume of the front cylinder space and a delivery of pressure fluid from this space, a reservoir for the fluid, and a seal which is V-shaped in cross-section and which is mounted in an annulus between the cylinder and the piston to prevent fluid flow out of the front cylinder space via the annulus, and which has a bottom portion and two legs which are interconnected via the bottom portion and project away from each other and forwards from said bottom portion, a first leg springingly sealing an outlet opening of a channel which communicates with the reservoir in such a manner that the first leg seals the outlet opening when the pressure of the fluid in the front cylinder space is greater than the pressure of the fluid in the reservoir, but opens the outlet opening when the pressure of the fluid in the reservoir is greater than the pressure of the fluid in the front cylinder space, said seal resting on a forwardly facing, radially outwardly extending surface of the piston, the seal's first leg projecting slantingly radially inwards and being arranged to come into abutment against an axially forwardly extending portion of the piston, and the seal's second leg projecting slantingly radially outwards and being arranged to slide on and constantly abut against an inner surface of the cylinder surface, wherein the first leg has greater elasticity than the second leg.

2. The pressure fluid-delivery device of claim 1, wherein a portion of the piston located rearwardly of the seal, relative to the axial direction of the cylinder, together with an adjacent cylinder portion define a rear cylinder space, said rear cylinder space constantly communicating with the reservoir, and wherein the outlet opening communicates with the rear cylinder space via said channel.

3. The pressure fluid-delivery device of claim 2, wherein the channel is in the piston.

4. The pressure fluid-delivery device of claim 2, the channel is an open groove in the seal bounded by a portion of the piston, the groove running radially in the bottom portion of the seal that rests on the forwardly facing, radially outwardly extending surface of the piston between a radially outer and inner side thereof and forwardly relative to the axial direction of the cylinder along an inner surface of the seal to near a portion of the first leg located near said bottom portion of the seal.

5. The pressure fluid-delivery device of claim 2, wherein the channel is a groove extending substantially spiral-shaped in the piston from a point facing the first leg of the seal to a radially outer edge of the outwardly extending surface of the piston that supports the seal's bottom portion.

6. The pressure fluid-delivery device of claim 1, wherein a holding element is securely connected to the piston, said holding element having a portion that abuts against a front surface of the bottom portion of the seal to hold the seal in place in the annulus.

* * * * *

UNITED STATES PATENT AND TRADEMARK OFFICE
CERTIFICATE OF CORRECTION

PATENT NO.     : 6,746,220 B2
DATED          : June 8, 2004
INVENTOR(S)    : Daniel Norheim It is certified that error appears in the above-identified patent and that said Letters Patent is hereby corrected as shown below:

<u>Column 6,</u>
Line 3, insert -- wherein -- after "claim 2,".

Signed and Sealed this

Seventh Day of September, 2004

JON W. DUDAS
*Director of the United States Patent and Trademark Office*